United States Patent
Moreau

(10) Patent No.: US 7,023,149 B2
(45) Date of Patent: Apr. 4, 2006

(54) CRT VERTICAL SCANNING CIRCUIT WITH A LOW POWER STANDBY

(75) Inventor: Jean-Michel Moreau, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 29 days.

(21) Appl. No.: 10/812,843

(22) Filed: Mar. 30, 2004

(65) Prior Publication Data

US 2004/0257008 A1    Dec. 23, 2004

(51) Int. Cl.
*G09G 1/04* (2006.01)

(52) U.S. Cl. ............... 315/407; 315/408; 315/411; 315/399; 348/805

(58) Field of Classification Search ............ 315/364, 315/369, 397, 395, 399, 380, 407, 408, 403, 315/411; 348/628, 707, 805

See application file for complete search history.

(56) References Cited

U.S. PATENT DOCUMENTS

| | | | | |
|---|---|---|---|---|
| 3,628,083 A | * | 12/1971 | Holmes et al. | 315/387 |
| 3,816,792 A | * | 6/1974 | Spencer, Jr. | 315/403 |
| 4,617,591 A | * | 10/1986 | Inoue et al. | 348/811 |
| 5,170,132 A | * | 12/1992 | Lucas et al. | 330/10 |
| 6,239,561 B1 | * | 5/2001 | Allender | 315/387 |

* cited by examiner

*Primary Examiner*—Haissa Philogene
(74) *Attorney, Agent, or Firm*—Lisa K. Jorgenson; James H. Morris; Wolf, Greenfield & Sacks, P.C.

(57) ABSTRACT

The invention concerns a scanning circuit, comprising a power supply providing a negative voltage on a first terminal (Tdown), an intermediate voltage on a second terminal (Gnd) and a positive voltage on a terminal of a switch (S), the other terminal of the switch being connected to a third terminal (Tup), a control circuit (6) supplied by connections to the second and third terminals, a differential amplifier receiving a positive and a negative input signal provided by the control circuit, a power amplifier controlled by the differential amplifier, both amplifiers being supplied by connections to the first and third terminals, a deflection coil (Ly) connected between the output of the power amplifier and the second terminal, biasing means setting, when the switch is open, the output of the differential amplifier so that the possible current paths through the power amplifier between the deflection coil and the first terminal are cut.

20 Claims, 2 Drawing Sheets

CRT VERTICAL SCANNING CIRCUIT WITH A LOW POWER STANDBY

BACKGROUND OF THE INVENTION

1. Field of the Invention

The present invention relates to scanning circuits of cathode ray tubes (CRTs) and more particularly to such circuits with a low power consumption at standby.

2. Discussion of the Related Art

FIG. 1 shows an exemplary CRT vertical scanning circuit together with control and supply circuits.

A power supply comprises a transformer 1 with a primary winding L1 connected to an AC supply source and two secondary windings L2+ and L2−. The secondary winding L2+ is connected between the ground and the anode of a diode D+. A storage capacitor C+ is connected between the cathode of the diode D+ and the ground. The secondary winding L2− is connected between the ground and the cathode of a diode D−. A storage capacitor C− is connected between the anode of the diode D− and the ground. In operation, the cathode of the diode D+ is at a positive voltage, for example +12V, and is connected to a terminal of a switch S. The other terminal of the switch S is connected to a terminal Tup. The anode of the diode D− is at a negative voltage, for example −12V, and is connected to a terminal Tdown.

A typical vertical scanning circuit 2 comprises a differential amplifier 3 providing a control signal c to a power amplifier 4. The output of the power amplifier 4 is connected to a first terminal of a deflection coil Ly. The second terminal of the deflection coil Ly is linked to the ground through a resistor R. Amplifiers 3, 4 are supplied by connections to terminals Tdown and Tup. The differential amplifier 3 receives negative and positive input signals E+ and E− from a control circuit 6 supplied by connections to terminal Tup and to the ground. The intermediate node Z between the deflection coil Ly and the resistor R is connected to the control circuit 6.

In operation, the switch S is closed. During the screen scanning, the deflection coil Ly current decreases linearly so that each scanned line is under the former one. Between two screen scannings, the current in deflection coil Ly increases very quickly, so that the spot is moved from the last line to the first one. The power amplifier 4 is in this example an inverting amplifier. When the difference voltage between input signals E+ and E− is positive, the current through the deflection coil Ly flows from the ground to terminal Tdown through "low-side" current paths of the power amplifier 4. When the difference voltage between input signals E+ and E− is negative, the current through the deflection coil Ly goes from terminal Tup to the ground through "high-side" current paths of the power amplifier 4.

So as to make sure that the current through the deflection coil Ly is correctly set by the vertical scanning circuit 2, the control circuit 6 measures the current in the deflection coil Ly by analyzing the voltage of the node Z. The negative input signal E− produced by the control circuit 6 fluctuates according to the drift of the measured current compared to the expected current in the deflection coil Ly. The positive input signal E+ acts as a control signal. If the measured current is too high, the voltage difference between the positive input signal E+ and the negative input signal E− is lowered so as to decrease the current in the deflection coil and conversely.

In standby mode, power consumption must be minimized. The switch S is open to save power. The terminal Tup is no longer powered. The voltage of terminal Tup decreases as a current is drawn by the amplifiers 3, 4. However, when the control circuit 6 is an integrated circuit, there are diodes 7 whose anodes are connected to the ground and whose cathodes are connected to terminal Tup. Therefore it remains a current path for discharging capacitor C− and the active elements remain supplied substantially at one half of the normal supply voltage. This causes a low power consumption that is generally considered tolerable when compared to the drawbacks of using a second switch for disconnecting capacitor C−.

However, the inventor has noted that in about one vertical scanning circuit out of two, the power consumption in the standby state was much higher than expected.

Consequently, the purpose of this invention is to present a scanning circuit such that its power consumption is always minimal in standby mode.

SUMMARY OF THE INVENTION

To attain these purposes and others, the present invention provides a scanning circuit, comprising a power supply providing a negative voltage on a first terminal, an intermediate voltage on a second terminal and a positive voltage on a terminal of a switch, the other terminal of the switch being connected to a third terminal, a control circuit supplied by connections to the second and third terminals, a differential amplifier receiving a positive and a negative input signal provided by the control circuit, a power amplifier controlled by the differential amplifier, both amplifiers being supplied by connections to the first and third terminals, a deflection coil connected between the output of the power amplifier and the second terminal, biasing means setting, when the switch is open, the output of the differential amplifier so that the possible current paths through the power amplifier between the deflection coil and the first terminal are cut.

In one embodiment of such a scanning circuit, the differential amplifier comprises eight transistors, the third and fourth transistors being of NPN type, the other transistors of PNP type, the base of the first transistor receiving the negative input signal, the base of the second transistor receiving the positive input signal, the emitters of the first and second transistors being connected to the collector of the sixth transistor, the emitter of the sixth transistor being connected to the third terminal, the base of the sixth transistor being connected to the collector of the eighth transistor, the base of the eighth transistor being connected to its collector, the emitter of the eighth transistor being connected to the third terminal, the collector of the eighth transistor being connected to a current source, the collector of the first transistor being linked to the first terminal by a first resistor, the collector of the second transistor being linked to the first terminal by a second resistor, the bases of the fifth and seventh transistors being connected to the base of the sixth transistor, the emitters of the fifth and seventh transistors being connected to the third terminal, the collector of the fifth transistor being connected to the collector of the third transistor, the emitter of the third transistor being connected to the collector of the first transistor, the collector of the third transistor being connected to its base, the collector of the seventh transistor being connected to the collector of the fourth transistor, the emitter of the fourth transistor being connected to the collector of the second transistor, the base of the fourth transistor being connected to the base of the third transistor.

In one embodiment of such a scanning circuit, a comparator receives on a first input a fixed voltage equal to the voltage of third terminal minus the voltage of a reference supply, the other input of the comparator being connected to the collector of the sixth transistor, a reference current source controlled by the comparator being connected to the collector of the third transistor.

In one embodiment of such a scanning circuit, an auxiliary P-type zone is provided near the P-type zone forming the collector of the sixth transistor, the auxiliary P-type zone being connected to the collector of the third transistor.

In one embodiment of such a scanning circuit, a P-type zone forms the common emitters of the fifth, sixth and seventh transistors, a N-type zone surrounding the emitter forms the common base of the transistors, three P-type zones surrounding the common base form the collectors of the transistors, all collectors being separated by narrow N-type zones, the length of opposite outlines of the collectors of the fifth and sixth transistors being larger than the length of opposite outlines of the collectors of the seventh and sixth transistors.

In one embodiment of such a scanning circuit, the differential amplifier comprises an input transistor pair receiving the positive and the negative input signals, the input transistor pair forming a first amplifying stage coupled to a second amplifying stage, and wherein the sizes of the transistors of the input transistor pair are different and wherein the sizes of the components of the second amplifying stage are different to balance the transistor size difference of the input transistor pair when the switch is open.

BRIEF DESCRIPTION OF THE DRAWINGS

The foregoing and others purposes, features, aspects and advantages of the invention will become apparent from the following detailed description of embodiments, given by way of illustration and not limitation with reference to the accompanying drawings.

Like reference numerals refer to like parts throughout the several views of the drawings.

DETAILED DESCRIPTION OF THE INVENTION

Figure 1:
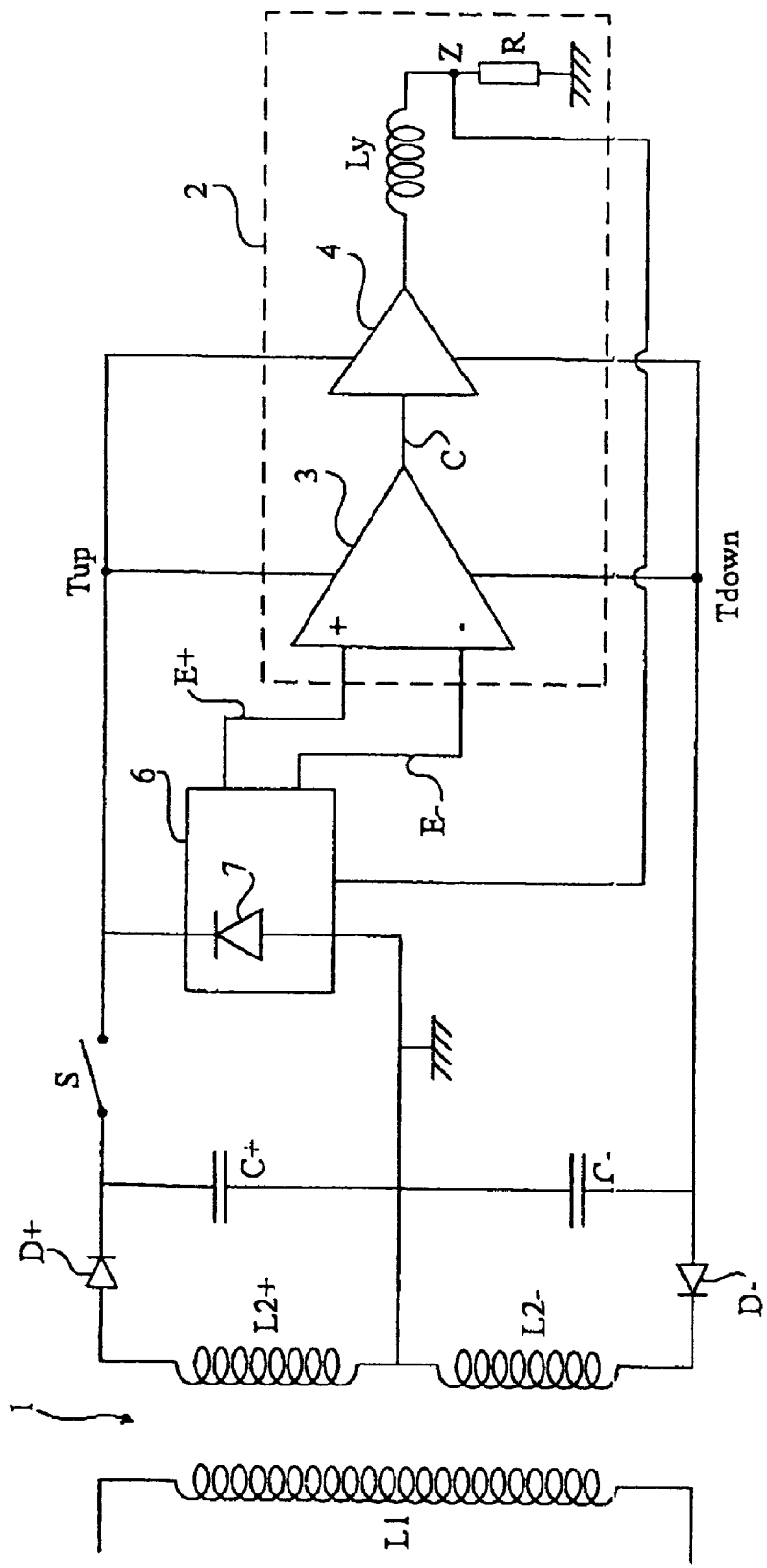
FIG. 1 is a circuit diagram, already described, of a vertical scanning circuit together with control and supply circuits.

The invention is based on an analysis of the operation of the circuit of FIG. 1 in standby mode.

In standby mode, it is commonly admitted that, as the control circuit does not provide any signal, the coil Ly is not supplied. However, due to the unavoidable dissymmetry of a practical circuit, one of the low- or high-side current paths of the power amplifier 4 is generally activated.

In the best case, when the control signal c is low, and equal to the voltage of Tdown (−12 V) in standby mode, only high-side current paths of the power amplifier 4 are conductive. Since terminal Tup is around the ground, both terminals of the deflection coil Ly are connected to the ground, and therefore no current is drawn.

In the worst case, when the control signal c is high, and equal to the ground in standby mode, there is a quite high current through the deflection coil Ly through the "low-side" current paths of the power amplifier 4 and the power consumption is high.

Figure 2:
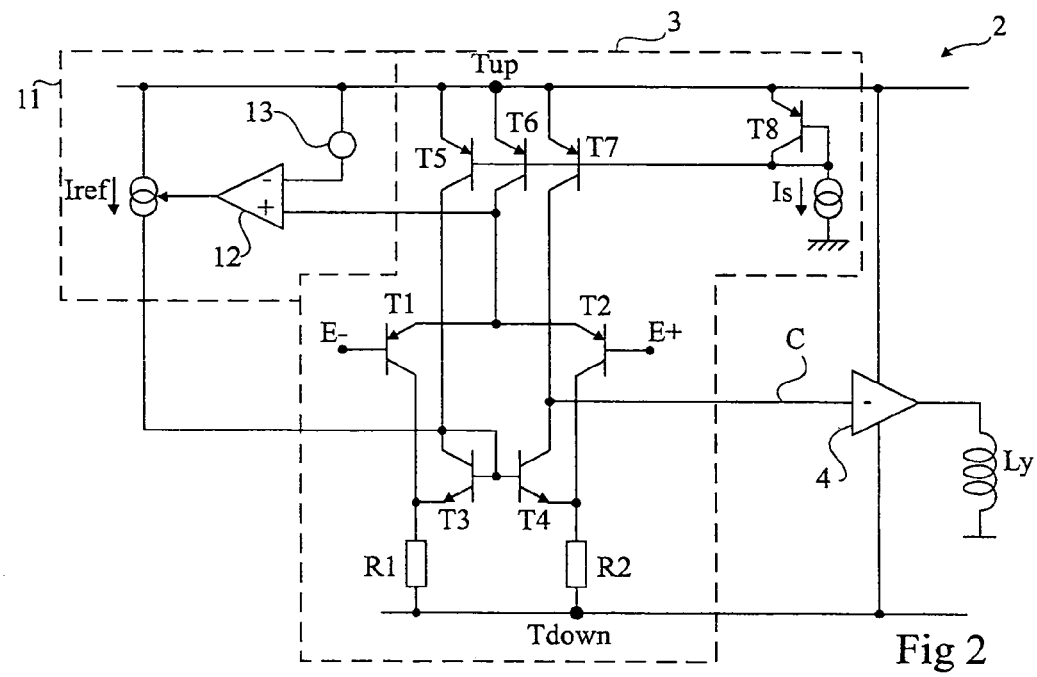
FIG. 2 is a circuit diagram of a scanning circuit according to the present invention.

FIG. 2 shows an implementation of the vertical scanning circuit 2 of FIG. 1 to which have been added elements according to an embodiment of the present invention. The differential amplifier 3 comprises a differential pair of PNP transistors T1 and T2. The base of transistor T1 receives the negative input signal $E^-$ and the base of PNP transistor T2 receives the positive input signal $E^+$. Both emitters of transistors T1 and T2 are connected to the collector of a PNP transistor T6. The emitter of transistor T6 is connected to terminal Tup. The base of transistor T6 is connected to the collector of a PNP transistor T8 connected as a diode, the base of transistor T8 being connected to its collector. The emitter of transistor T8 is connected to terminal Tup. The collector of transistor T8 is connected to a current source Is. The collector of transistor T1 is linked to terminal Tdown by a resistor R1. The collector of transistor T2 is linked to terminal Tdown by a resistor R2. The bases of two PNP transistors T5 and T7 are connected to the base of transistor T6. The emitters of transistors T5 and T7 are connected to terminal Tup. The collector of transistor T5 is connected to the collector of a NPN transistor T3 whose emitter is connected to the collector of transistor T1. Transistor T3 is connected as a diode, its collector being connected to its base. The collector of transistor T7 is connected to the collector of a NPN transistor T4, whose emitter is connected to the collector of transistor T2. The base of transistor T4 is connected to the base of transistor T3.

Transistors T1 and T2 are identical, as well as transistors T3 and T4, transistors T5 and T7, and resistors R1 and R2.

During normal operation, when terminal Tup is at a positive voltage, +12 V, the differential amplifier 3 compares input signals $E^-$ and $E^+$, at least one of the signals being at a lower voltage than the voltage of terminal Tup.

When the voltage of positive input signal $E^+$ is higher than the voltage of negative input signal $E^-$, the current through transistor T1 is higher than the current through transistor T2. Consequently, the voltage on the emitter of transistor T3 is higher than the voltage on the emitter of transistor T4. As a result, the voltage difference between the base and the emitter of transistor T4 is higher than the voltage difference between the base and the emitter of transistor T3. The currents delivered to transistors T3 and T4 are equal, as they are imposed by the current mirror constituted of transistors T5, T6 and T8. As a result, the current drawn by transistor T4 is higher than the current provided by transistor T7. As a consequence, the control signal c decreases. More precisely, the control signal c is lower than a common mode voltage $V_{cm}$ which corresponds to the voltage of control signal c when input signals $E^-$ and $E^+$ are equal and the current through the deflection coil Ly goes from terminal Tup to the ground through "high-side" current paths of the power amplifier 4.

Conversely, when the voltage of negative input signal E− is higher than the voltage of positive input signal E+, the control signal c is higher than the common mode voltage $V_{cm}$.

In standby mode, the voltage of terminal Tup is around zero as it is linked to the ground by the diodes 7 as described previously. The input signals $E^-$ and $E^+$ are around zero. As a consequence, the transistors T1 and T2 are both off. The currents through transistors T3 and T4 are equal and fixed by transistors T5 and T7. As the matching of transistors T3 and T4, resistors R1 and R2 and transistors T5 and T7 cannot be perfect, the control signal c cannot be predicted, and differs from a chip to another. If resistor R2 is a little larger than resistor R1, or if transistor T3 is larger than transistor T4, or if transistor T7 is larger than transistor T5, the control signal c is high, near the ground in this case. Conversely, if resistor R1 is larger than resistor R2, or if transistor T4 is larger than transistor T3, or if transistor T5 is larger than transistor T7, the control signal c is low, near the voltage of Tdown.

According to the present invention, a circuit 11 is provided to make sure that the control signal c is always low in standby mode, so that the above-mentioned low-side current paths are never activated in standby mode.

In circuit 11, a comparator 12 receives on its negative input a fixed voltage equal to the voltage of terminal Tup minus the voltage of a reference supply source 13. The positive input of comparator 12 is connected to the collector of transistor T6. A reference current source Iref, controlled by comparator 12, is connected to the collector of transistor T3.

During normal operation, when terminal Tup is powered, the transistor T6 is in active mode. The voltage of the collector of transistor T6 depends on the voltage of input signals E− and E+ produced by circuit 6, it is usually in the range 0–4 V when the voltage of terminal Tup is equal to +12 V. The voltage of the reference supply source 13 is chosen lower than the voltage between terminal Tup and the collector of transistor T6. Consequently, the output of comparator 12 is low and no current is provided by the reference current source Iref.

In standby mode, the voltage between the collector and the emitter of transistor T6 decreases and transistor T6 goes to saturation. The voltage between terminal Tup and the collector of transistor T6 is lower than the voltage of the reference supply source 13. The output of comparator 12 is high, and a reference current is provided to transistor T3. Thus, the current through transistor T3 is higher than the current through transistor T4. Consequently, the voltage of control signal c is low and the output of power amplifier 4 is biased towards the voltage of terminal Tup. The power consumption is minimal.

Figure 3:
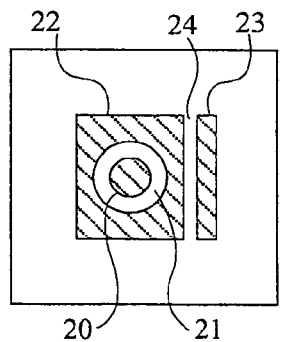
FIG. 3 shows an embodiment of a part of a scanning circuit according to the present invention.

FIG. 3 is a top view of transistor T6 of the differential amplifier 3 together with added elements forming an embodiment of the present invention. P-type zones are hatched and N-type zones are white. In this example, the emitter is a small circular P-type zone 20. The emitter is surrounded by a circular N-type zone 21 forming the base of the transistor. The base is surrounded by a P-type zone 22 forming the collector of the transistor. The external outline of the collector forms a square. A P-type zone 23 forming an auxiliary collector is near the right side of the collector of the transistor, both collectors being separated by a very small N-type zone 24. The auxiliary collector is connected to the collector of transistor T3.

In standby mode, the transistor T6 is saturated as described previously. Electrical carriers are injected from the collector of transistor T6 to the auxiliary collector. An auxiliary current is created in the auxiliary collector. The auxiliary current provided to transistor T3 unbalances the pair of transistors T3–T4 and the control signal c is low.

During normal operation, the transistor T6 is not saturated and no auxiliary current is provided, the differential amplifier operates normally.

By adding an auxiliary collector zone having a very small area compared to the global area of the differential amplifier 3, it is possible to obtain the result sought for, i.e. to have a power consumption always minimal in standby.

Figure 4:
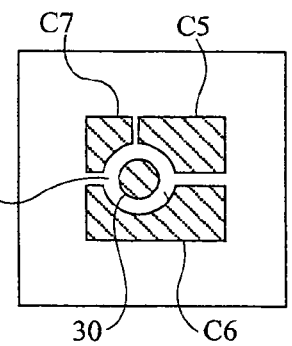
FIG. 4 shows another embodiment of a part of a scanning circuit according to the present invention.

FIG. 4 is a top view of transistors T5, T6 and T7 of the differential amplifier 3 of FIG. 2 according to another embodiment of the present invention. P-type zones are also hatched and N-type zones are white. The emitter common to all transistors is a small circular P-type zone 30. The emitter is surrounded by a circular N-type zone 31 forming the common base of all transistors. All collectors are realized within a rectangular shaped zone surrounding the base. The bottom half part of the rectangular shape constitutes the collector C6 of transistor T6. The top half part of the rectangular shape zone is divided into two unequal area zones, the smaller zone being the collector C7 of transistor T7, the largest zone being the collector C5 of transistor T5. Collectors C5, C6 and C7 are separated by narrow N-type zones. Though collectors C5 and C7 have different areas, the length of the outline of C7 opposite to the outline of the emitter is equal to the length of the outline of C5 opposite to the outline of the emitter. However, the length of the outline of C5 opposite to the outline of C6 is larger than the length of the outline of C7 opposite to the outline of C6.

In standby mode, electrical carriers are emitted by collector C6 and injected into collectors C5 and C7. As the opposite outline lengths between collectors C5/C6 and collectors C7/C6 are different, the current created in collector C5 is higher than the current created in collector C7.

Figure 5:
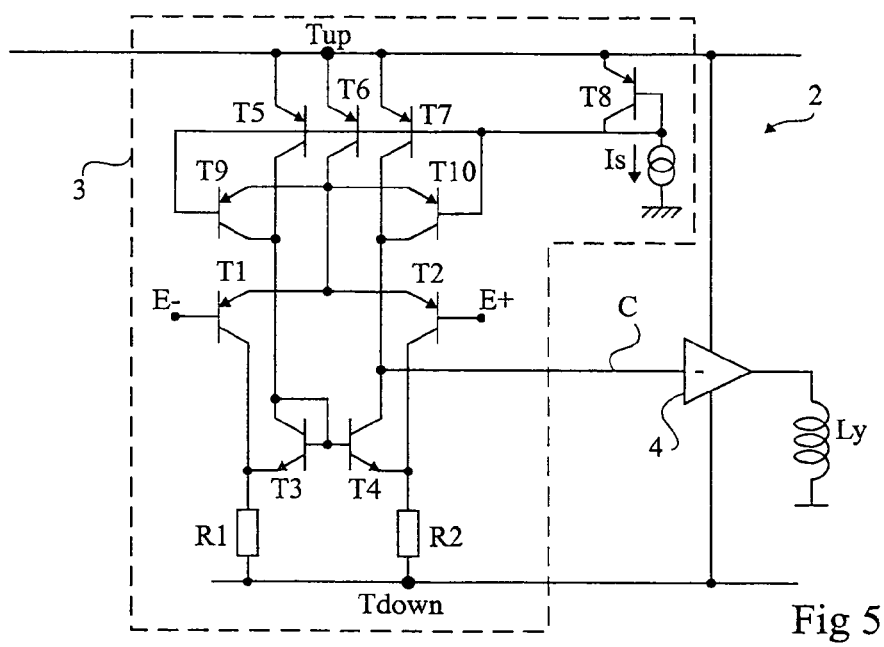
FIG. 5 is a circuit diagram corresponding to the embodiment of FIG. 4.

FIG. 5 is an equivalent circuit of the differential amplifier 3 implemented with transistors T5, T6 and T7 realized as described previously in relation to FIG. 4. In fact, two transistors T9 and T10 are added to the differential amplifier 3. The collector of transistor T8 is connected to the base of transistors T9 and T10. The emitters of transistors T9 and T10 are connected to the collector of transistor T6. The sizes of transistors T9 and T10 are different, T9 being larger than T10. The collector of transistor T9 is connected to the collector of transistor T3. The collector of transistor T10 is connected to the collector of transistor T4.

During normal operation, transistor T6 is not saturated and the voltage of its collector is lower than the voltage of its base. Thus, the transistors T9 and T10 are off.

In standby mode, the collector voltage of transistor T6 is higher than its base voltage. The transistors T9 and T10 are on. As transistor T9 is larger than transistor T10, the current provided to transistor T3 is higher than the current provided to transistor T4. Thus, the control signal c is low and the power consumption is minimal. According to another embodiment of a scanning circuit according to the invention, the pair of transistors T1/T2 and either the pair of transistors T3/T4 and/or the pair of transistors T5/T7 and/or the resistors R1/R2 are unbalanced. The differential amplifier 3 is such that when transistors T1 and T2 are off the control signal c is low. Transistor T4 is then larger than transistor T3 or/and transistor T5 is larger than transistor T7 or/and resistor R1 is larger than resistor R2. To compensate the unbalanced pairs (T4/T3, T5/T7, R1/R2) during normal operation, transistor T2 is larger than transistor T1.

Having thus described three illustrative embodiments of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalent thereto.

What is claimed is:

1. A scanning circuit, comprising:
   a power supply providing a negative voltage on a first terminal, an intermediate voltage on a second terminal and a positive voltage on a terminal of a switch, the other terminal of the switch being connected to a third terminal,
   a control circuit supplied by connections to the second and third terminals,
   a differential amplifier receiving a positive and a negative input signal provided by the control circuit,
   a power amplifier controlled by the differential amplifier, both amplifiers being supplied by connections to the first and third terminals,
   a deflection coil connected between the output of the power amplifier and the second terminal,
   biasing means for setting, when the switch is open, the output of the differential amplifier so that a current path through the power amplifier between the deflection coil and the first terminal is substantially eliminated.

2. A scanning circuit according to claim 1, wherein the differential amplifier comprises eight transistors, the third and fourth transistors being of NPN type, the other transistors of PNP type, the base of the first transistor receiving the negative input signal, the base of the second transistor receiving the positive input signal, the emitters of the first and second transistors being connected to the collector of the sixth transistor, the emitter of the sixth transistor being connected to the third terminal, the base of the sixth transistor being connected to the collector of the eighth transistor, the base of the eighth transistor being connected to its collector, the emitter of the eighth transistor being connected to the third terminal, the collector of the eighth transistor being connected to a current source, the collector of the first transistor being linked to the first terminal by a first resistor, the collector of the second transistor being linked to the first terminal by a second resistor, the bases of the fifth and seventh transistors being connected to the base of the sixth transistor, the emitters of the fifth and seventh transistors being connected to the third terminal, the collector of the fifth transistor being connected to the collector of the third transistor, the emitter of the third transistor being connected to the collector of the first transistor, the collector of the third transistor being connected to its base, the collector of the seventh transistor being connected to the collector of the fourth transistor, the emitter of the fourth transistor being connected to the collector of the second transistor, the base of the fourth transistor being connected to the base of the third transistor.

3. A scanning circuit according to claim 2, wherein a comparator receives on a first input a fixed voltage equal to the voltage of third terminal minus the voltage of a reference supply, the other input of the comparator being connected to the collector of the sixth transistor, a reference current source controlled by the comparator being connected to the collector of the third transistor.

4. A scanning circuit according to claim 2, wherein an auxiliary P-type zone is provided near a P-type zone forming the collector of the sixth transistor, the auxiliary P-type zone being connected to the collector of the third transistor.

5. A scanning circuit according to claim 2, wherein a P-type zone forms the common emitters of the fifth, sixth and seventh transistors, a N-type zone surrounding the emitter forms the common base of the transistors, three P-type zones surrounding the common base form the collectors of the transistors, all collectors being separated by narrow N-type zones, the length of opposite outlines of the collectors of the fifth and sixth transistors being larger than the length of opposite outlines of the collectors of the seventh and sixth transistors.

6. A scanning circuit according to claim 1, wherein the differential amplifier comprises an input transistor pair receiving the positive and the negative input signals, the input transistor pair forming a first amplifying stage coupled to a second amplifying stage, and wherein the sizes of the transistors of the input transistor pair are different and wherein the sizes of the components of the second amplifying stage are different to balance the transistor size difference of the input transistor pair when the switch is open.

7. A scanning circuit, comprising:
   a switch;
   a first supply terminal coupled to the switch;
   a deflection coil;
   a power amplifier coupled to the first supply terminal and the deflection coil;
   a differential amplifier having an output coupled to the power amplifier; and
   at least one biasing component that sets an output of the differential amplifier to a determined voltage such that a current path through the power amplifier is substantially eliminated, the output of the differential amplifier being set to the determined voltage in response to a voltage of the first supply terminal reaching a threshold.

8. The scanning circuit of claim 7, wherein the at least one biasing component comprises a comparator.

9. The scanning circuit of claim 8, wherein the at least one biasing component further comprises a reference voltage source having a first terminal coupled to a first input of the comparator and a second terminal coupled to the first supply terminal.

10. The scanning circuit of claim 9, wherein the at least one biasing component further comprises a first transistor having an emitter coupled to the first supply terminal and a collector coupled to a second input of the comparator.

11. The scanning circuit of claim 8, further comprising a current source coupled to an output of the comparator.

12. The scanning circuit of claim 11, wherein the current source is further coupled to the voltage supply terminal and a second transistor.

13. The scanning circuit of claim 12, wherein the current source is coupled to a collector and base of the second transistor.

14. The scanning circuit of claim 12, wherein the current source provides a current to the second transistor in response to the voltage of the first supply terminal reaching the threshold.

15. The scanning circuit of claim 7, wherein the determined voltage is a low voltage.

16. The scanning circuit of claim 7, wherein the at least one biasing component comprises transistors coupled to the first supply terminal having different sizes such that the output of the differential amplifier is set to the determined voltage in response to a voltage of the first supply terminal reaching the threshold.

17. The scanning circuit of claim 16, wherein at least two of the transistors have collectors of different sizes, a common base, and a common emitter coupled to the first supply terminal.

18. The scanning circuit of claim 7, wherein the at least one biasing component comprises a first transistor having an emitter coupled to the first supply terminal and an auxiliary collector coupled to the base and collector of a second transistor.

19. The scanning circuit of claim 7, wherein the threshold is approximately zero volts.

20. The scanning circuit of claim 7, wherein the voltage of the first supply terminal reaches the threshold in response to a transition of the switch from an on state on an off state.

* * * * *

UNITED STATES PATENT AND TRADEMARK OFFICE
CERTIFICATE OF CORRECTION

| | |
|---|---|
| PATENT NO. | : 7,023,149 B2 |
| APPLICATION NO. | : 10/812843 |
| DATED | : April 4, 2006 |
| INVENTOR(S) | : Jean-Michel Moreau |

Page 1 of 1

It is certified that error appears in the above-identified patent and that said Letters Patent is hereby corrected as shown below:

Title page
Related U.S. Application Data Insert
Item
(63)   Continuation of application Ser. No. 10/423,342, filed on April 25, 2003, now abandoned.

Signed and Sealed this

Seventh Day of October, 2008

JON W. DUDAS
*Director of the United States Patent and Trademark Office*